May 17, 1932. B. P. JOYCE 1,859,039
PACKING
Filed Sept. 16, 1927 5 Sheets-Sheet 1

INVENTOR
Bryan P. Joyce

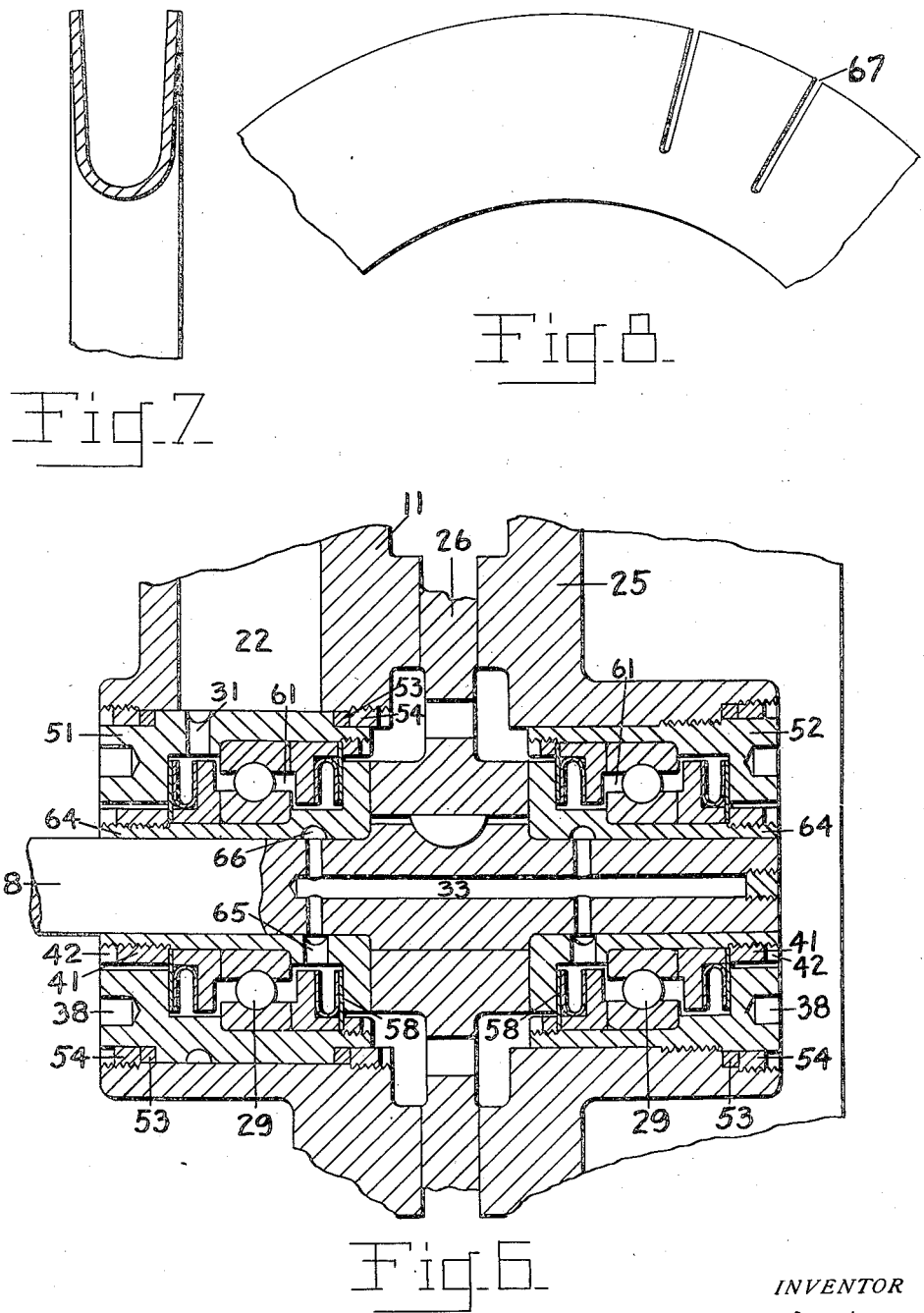

May 17, 1932. B. P. JOYCE 1,859,039
PACKING
Filed Sept. 16, 1927 5 Sheets-Sheet 5

INVENTOR
Bryan P. Joyce

Patented May 17, 1932

1,859,039

UNITED STATES PATENT OFFICE

BRYAN P. JOYCE, OF DAVENPORT, IOWA

PACKING

Application filed September 16, 1927. Serial No. 219,989.

My invention has reference, in general, to packing, and more particularly it relates to a packing embodying a fluid seal.

The principal object of my invention is to provide a simple, compact and effective fluid seal packing. Among the further objects of my invention are: to provide means to compensate for the friction and weight of the device which transmits pressure to the sealing fluid; to provide novel means for placing the sealing chambers of two or more packings in communication with the source of sealing fluid; to provide novel rings for inclosing the fluid seal; to provide a fluid seal packing which may be assembled as a unit; to so arrange the packing rings that they cannot be injured in assembly through over compression; to provide a packing capable of working in conjunction with parts moving at high speeds; and such further objects, advantages and capabilities as will hereafter appear and as are inherent in the construction disclosed herein. My invention further resides in the combination, construction and arrangement of parts illustrated in the accompanying drawings, and, while I have disclosed therein what is now considered the preferred form of this invention and modifications thereof, I desire it understood that the present disclosure is to be considered as illustrative only and not as limiting my invention.

Figure 1:
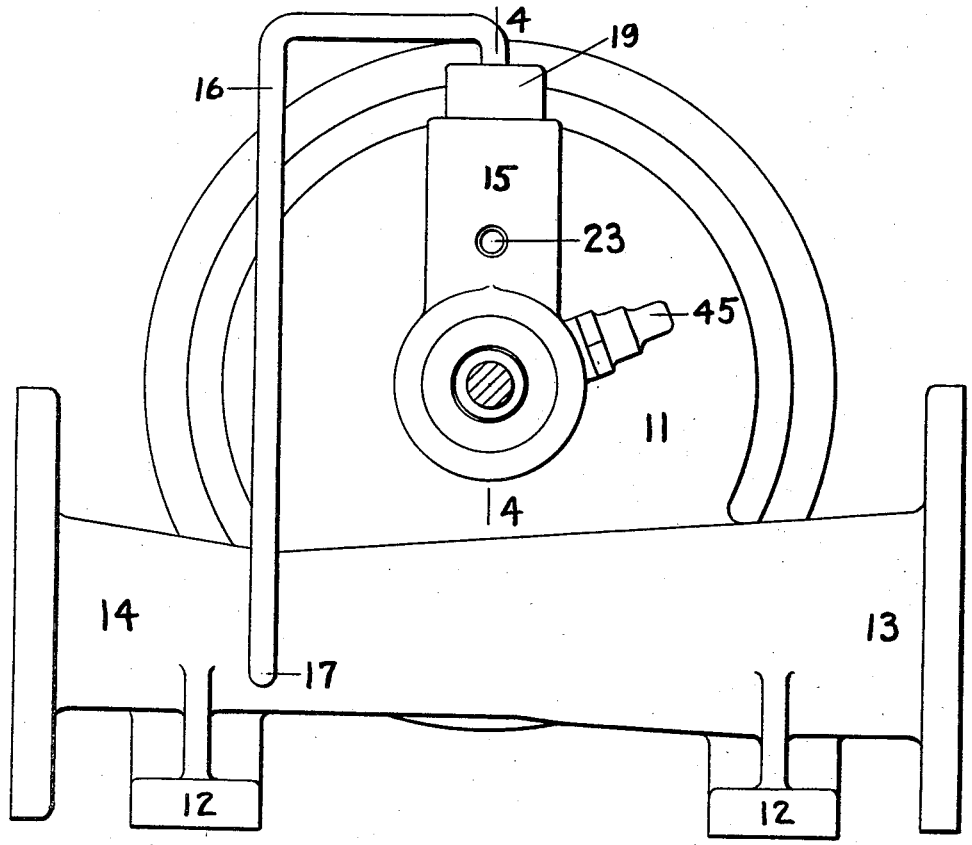
Figure 2:
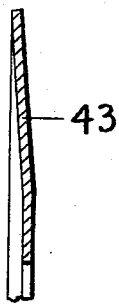
Figure 3:
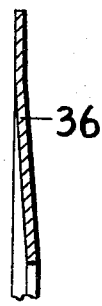
Figure 4:
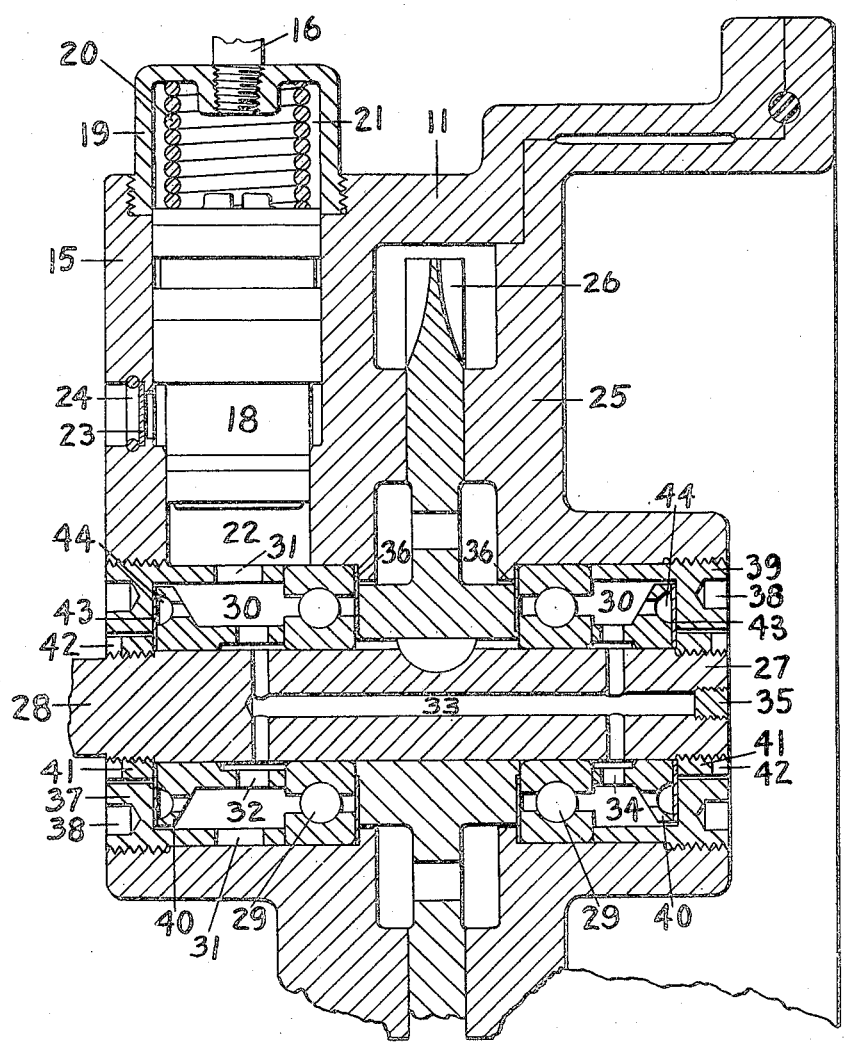
Figure 5:
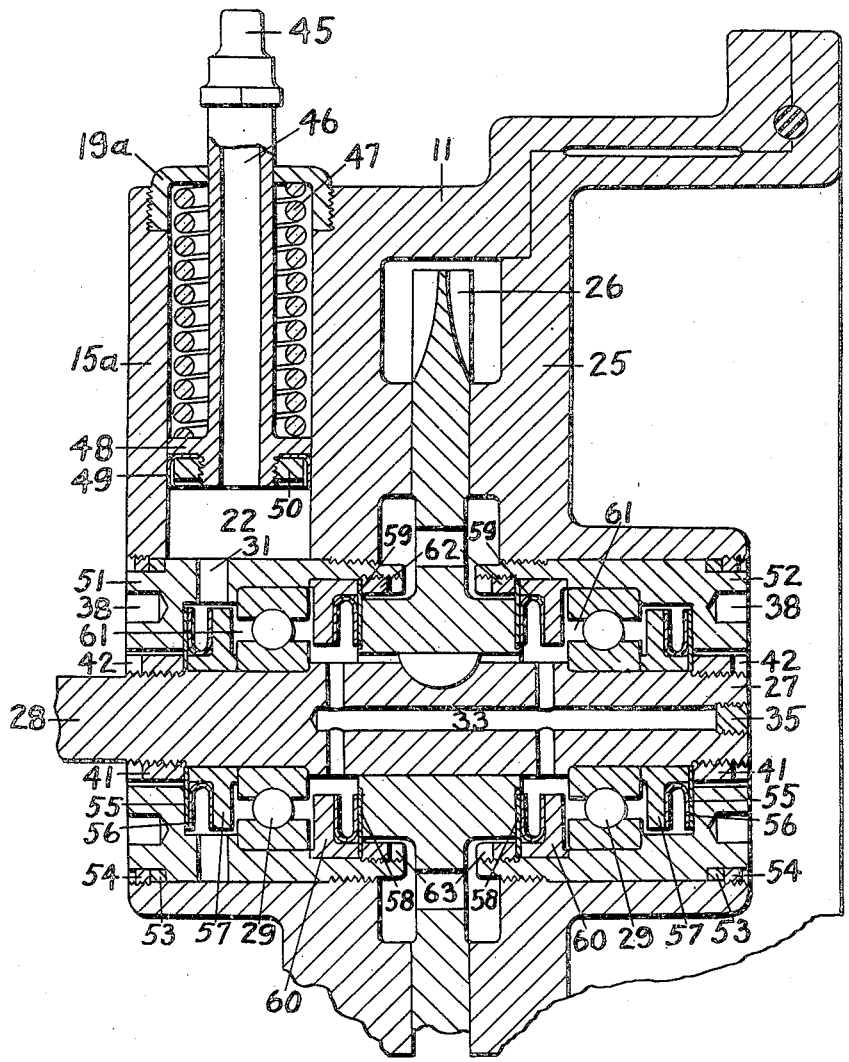
Figure 10:
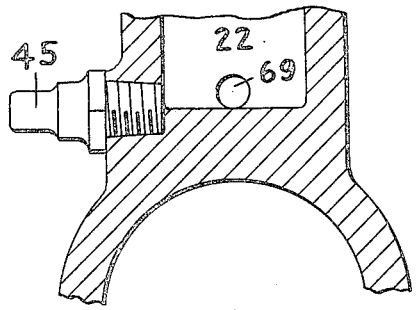
Figure 9:
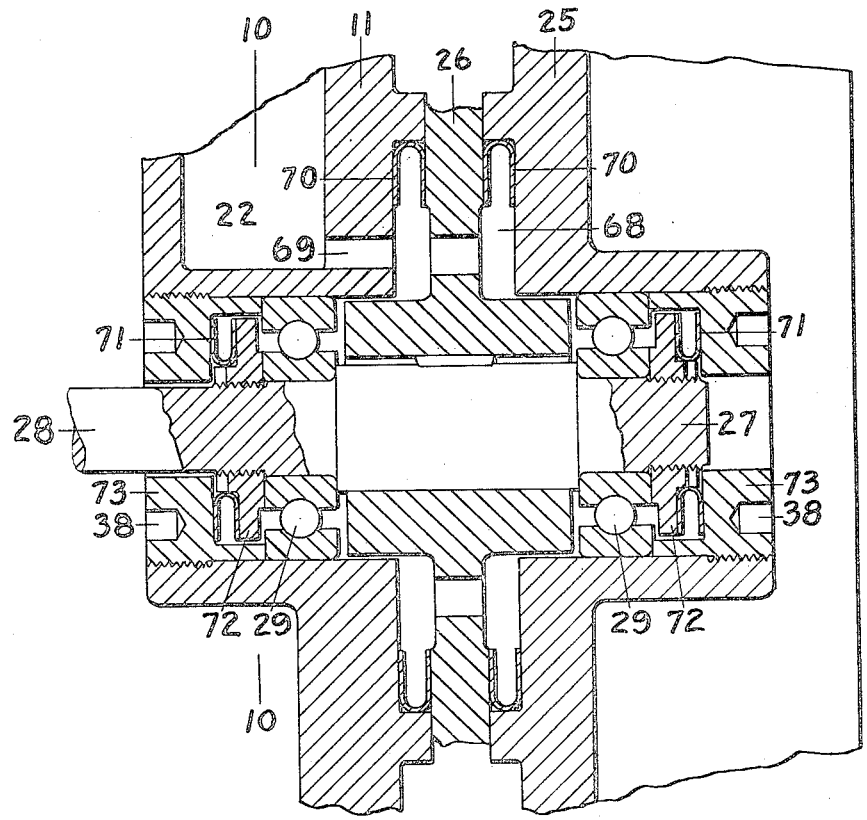

In the drawings annexed hereto and forming a part hereof, Fig. 1 shows a side view of a rotary pump; Fig. 2 shows a partial sectional view of a packing ring; Fig. 3 is a similar view of a modification of the same; Fig. 4 is a sectional view on the line 4—4 of Fig. 1; Fig. 5 is a similar view showing a modification; Fig. 6 is a similar view showing a further modification; Fig. 7 shows a partial sectional view of a pressure ring; Fig. 8 shows a partial side view of a pressure ring; Fig. 9 is a partial section of a modification of the structure shown in Fig. 1, taken on a plane corresponding to the line 4—4 of Fig. 1; Fig. 10 is a partial sectional view on the line 10—10 of Fig. 9.

Referring more in detail to the annexed drawings, 11 designates a pump casing with supports 12 and having an inlet 13 and outlet 14. The tube 16 admits fluid under pressure to the cylinder 15 from the discharge 14 to which the tube is connected as at 17. The cylinder 15 is extended by means of the cap 19 which seats a spring 20 to act upon a differential piston 18. The purpose and function of this piston 18 is fully explained in my Patent No. 1,721,737 dated July 23, 1929. The piston 18 places the fluid in the chamber 22 under pressure due to pressure of fluid in the chamber 21 from the discharge 14. The pressure of the fluid in the chamber 22 makes the packing of the piston 18 effective. In machines such as pumps which are started and stopped, the discharge pressure is recurrently zero. When the pump is started from zero pressure in the chamber 21 some of the fluid from this chamber is likely to leak by the packing of the piston 18 before the pressure in the chamber 22 attains sufficient magnitude to make the packing of the piston 18 effective; therefore the spring 20 is adapted to act upon the piston 18 to overcome its packing friction and keep the fluid in the chamber 22 at all times under a slight pressure. In some cases it is desirable to so place the piston 18 that its weight will not act upon the fluid in the chamber 22. In such case the spring 20 should be of such strength as to take care of both the weight and the packing friction of the piston 18. A transparent disc 23 is fixed in the cylinder 15 by means of the spring ring 24 in order that the position of the piston 18 may be observed and yet foreign matter be excluded from the cylinder. The position of the piston 18 indicates the reserve of sealing fluid in the chamber 22.

In the structure shown in Fig. 4, the rotor 26 is fixed to the shaft 27 and mounted in the casing 11 and cover 25 by means of the radial thrust bearings 29. The rings 37 and 39 are threaded into the casing and cover, against the outer races of the bearings 29 which in turn clamp the packing rings 36 around their outer circumferences to the shoulders in the casing and cover. The inner races of the bearings 29 are clamped to the rotor 26, through the spacer rings 40, and to the inner circumferences of the packing rings 43, by means of the ring nuts 41, screwed upon the shaft 27 by means of spaner slots 42. The shaft 27 projects to the left, as at 28, in order that the pump may be driven; if required the shaft may project to the right, also, to accommodate another stage. As fully explained in one of my copending applications, inserts of soft metal may be placed in the rotor 26 to contact the packing rings 36 and the portion of 36 in contact therewith may be highly polished; this remark also applies to packing rings 43 and rings 37 and 39. The packing rings 43 and 36 are of thin flexible metal and are dished as shown in Figs. 2 and 3, and, in being assembled, are put under such pressure that they are comparatively flat, resulting in close contact with their friction bearing surfaces. The device is manufactured with such tolerances that the rings 36 cannot bind between the rotor 26 and the inner race of the bearings 29, nor can the rings 43 bind between the spacer rings 40 and the rings 37 and 39. Sealing fluid is admitted to the left hand chamber 30 through the valve 45 (Fig. 1), from this chamber through 31 into the chamber 22, and through 32, 33 and 34 into the right hand chamber 30. A series of holes 31 are in the ring 37 in order that at least one will open into the chamber 22. The piston 18 keeps the sealing fluid under greater unit pressure than the fluid pumped and the sealing fluid acting upon the packing rings prevents any escape of the fluid pumped. Grooves and ports 44 in the rings 40 are provided to facilitate action of the sealing fluid upon the rings 43. Sealing fluid is admitted to the rings 36 through the bearings 29.

Fig. 5 is a cross section through a rotary pump similar to the section shown in Fig. 4. This figure shows a pump which operates under comparatively low head and pressure, for example a maximum pressure equivalent to 100 foot head of water, approximately 43 lbs. per square inch. In such case a device such as the differential piston 18 (Fig. 4) is not necessary and a piston 48 may be mounted in the cylinder 15a, a spring 47 acting between the cap 19a and the piston to exert pressure upon the fluid in the chamber 22, the spring being adapted to place the sealing fluid under greater unit pressure than the fluid pumped. The piston is packed by the ring 49 held in place by the ring nut 50. Fluid is admitted to the chamber 22 by the valve 45 and the hole 46 in the piston. The amount the piston projects above the cap 19a indicates the amount of fluid within the chamber 22. The fluid seals 61 are in communication with the chamber 22 by means of the passages 31 and 33. In some cases it is desirable to make the packing rings 55 and 58 without dish and depend upon pressure rings such as 56 and 59, or upon the sealing fluid, to force them in contact with their friction surfaces. It is often desirable to so construct the packing that it may be assembled and removed practically as a unit. This figure shows a packing of this nature. The rings 51 and 52, threaded into the casing 11 and cover 25, carry the parts 55, 56, 57, 29, 60, 59 and 58 which are held therein by the ring 62, turned into place by means of the spanner slots 63. After the rings 51 and 52 carrying the above parts are assembled, the inner races of the bearings 29 and adjacent parts are locked against the shoulders upon the shaft 27 by means of the ring nuts 41. The rings 51 and 52 are then packed by the packing ring 53 and gland 54.

The ring 51 in Fig. 6 carries the same parts as in Fig. 5, and is secured in the casing 11 between the packing rings 53 with their glands 54. The ring 52 is as in Fig. 5. Instead of the inner races of the bearings 29 being locked against shoulders on the shaft, they are locked as formerly against a suitable shoulder on the part 64 which has suitable holes and grooves 65 and 66 to match the passages 33 and so place the sealing chambers 61 in communication. The sealing fluid may be placed under pressure by either of the devices shown in Figs. 4 and 5. This construction does not require that inserts of soft metal be placed in the rotor to contact the inner packing rings 58, such inserts being carried in the part 64. This construction permits the packing, including the bearing, to be manufactured and shipped as a unit. The packing rings may be coated with soft metal except upon their friction bearing surfaces for reasons as fully set forth in one of my copending applications, or may be made of an alloy not easily corrodible such as iron and nickel, the nickel content being about 30%.

The U shaped pressure rings are shown in partial view and section in Figs. 7 and 8. They are flared as shown and may be formed with slots 67 if desired.

In Fig. 9 is disclosed a very simple and effective U shaped packing having one central sealing chamber 68 closed by the packing rings 70 and 71. The fluid in the chamber 22 may be placed under pressure by devices shown in Figs. 4 and 5. The hole 69 connects chambers 22 and 68. The valve 45 (Fig. 10) admits fluid to the chamber 22 when the device shown in Fig. 4 is used. The rings 72 lock the inner race of the bearings 29 against the shoulders on the shaft 27 and seat the packing rings 71. The rings 73 seat the outer races of the bearings 29 and also carry the inserts of soft metal to contact the packing rings 71. Both rings 70 and 71 are flared similar to the pressure ring shown on Fig. 7. The portions of the rotor 26 contacting the rings 70 carry inserts of soft metal. This construction is much simpler than those previously shown and increases the efficiency of the pump by preventing slippage between the rotor and the casing and cover.

While I have shown and described certain specific embodiments of my invention, it is of course understood that the specific description of structure set forth above may be departed from without departing from the spirit of my invention as set forth in this specification and the appended claims.

Having now described my invention, I claim:

1. In a pressure fluid machine, packing rings mounted between relatively movable parts of the machine to provide a packing chamber between them, a piston mounted in one of the machine parts and forming therewith a piston chamber, said piston chamber and packing chamber being full of packing fluid and in open communication with each other, means for subjecting said piston to pressure from the machine fluid, said piston being constructed to place the packing fluid under greater pressure than the machine fluid, and resilient means acting on and co-operating with the piston to maintain the packing fluid under pressure at all times and in excess of the machine fluid pressure prior to action of said machine fluid on said piston.

2. In a machine embodying a casing containing fluid under pressure, and a rotor in said casing; spaced packing means between the rotor and casing providing a packing chamber between them, each of said packing means embodying relatively fixed and rotatable portions having continuous sealing surfaces contacting with each other in a plane transverse to the rotor axis, said packing chamber being full of fluid, and means integral with one of the machine parts for maintaining the packing fluid under greater pressure than the machine fluid, said sealing surfaces being held in sealing contact by the pressure of said packing fluid.

3. A structure as specified in claim 2; together with a rotor bearing within said packing chamber, said packing fluid having lubricating qualities.

4. In a pressure fluid machine embodying a casing and a rotor in said casing; spaced packing means between the rotor and casing providing a plurality of packing chambers spaced apart longitudinally of the rotor axis, said chambers being in communication, and means integral with one of the machine parts for supplying packing fluid to said chambers at a pressure in excess of the machine fluid pressure, said rotor having equal and opposite end thrust areas subjected to the pressure of the packing fluid.

5. In a pressure fluid machine embodying a casing and a rotor in said casing; spaced packing means between the rotor and casing providing a packing chamber between them, each of said packing means embodying relatively fixed and rotatable portions having continuous sealing surfaces contacting with each other in a plane transverse to the rotor axis, at least one of said portions of each of said packing means consisting of a thin metal ring, a radial and thrust bearing for the rotor mounted within said chamber, and means for supplying lubricating and packing fluid to said chamber at a pressure in excess of the machine fluid pressure to lubricate said bearing and hold said sealing surfaces in contact, said thin metal rings being free to yield longitudinally of the rotor to allow said bearing to resist end thrusts without straining said rings, said packing portions being free to relatively slide radially should the bearing allow radial movement of the rotor.

6. In a machine embodying a casing containing fluid under pressure, and a rotor in said casing; spaced packing means between the rotor and casing providing a plurality of packing chambers between them spaced apart longitudinally of the rotor, said packing means embodying packing rings having sealing surfaces contacting in planes transverse to the rotor axis, said chambers being in communication, and means integral with one of the machine parts for supplying packing fluid to said chambers at a pressure in excess of the machine fluid, said rotor having equal and opposite end thrust areas exposed to the pressure of the packing fluid.

In witness whereof, I hereunto subscribe my name to this specification.

BRYAN P. JOYCE.